United States Patent
Horiuchi

(10) Patent No.: US 11,822,506 B2
(45) Date of Patent: Nov. 21, 2023

(54) PRIMARY CHECK SYSTEM

(71) Applicant: DENSO TEN Limited, Kobe (JP)

(72) Inventor: Kazuo Horiuchi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/583,480

(22) Filed: Jan. 25, 2022

(65) Prior Publication Data

US 2023/0063924 A1    Mar. 2, 2023

(30) Foreign Application Priority Data

Aug. 24, 2021   (JP) .................................. 2021-136355

(51) Int. Cl.
*G06F 9/30*     (2018.01)
*G06F 13/42*    (2006.01)

(52) U.S. Cl.
CPC ........ *G06F 13/4282* (2013.01); *G06F 9/3005* (2013.01)

(58) Field of Classification Search
CPC ........................... G06F 13/4282; G06F 9/3005
USPC ........................... 710/10, 18, 36, 65, 71, 313
See application file for complete search history.

(56) References Cited

U.S. PATENT DOCUMENTS

| | | | | |
|---|---|---|---|---|
| 4,761,643 A | * | 8/1988 | Fujiwara | H04N 1/32112 345/539 |
| 7,418,041 B2 | * | 8/2008 | Jung | H04L 27/2617 375/295 |
| 8,010,860 B2 | * | 8/2011 | Jenkins | H04L 1/1874 710/310 |
| 2002/0174375 A1 | * | 11/2002 | Oh | G06F 1/3237 713/500 |
| 2004/0252111 A1 | * | 12/2004 | Cheon | G09G 3/3611 345/204 |
| 2006/0069816 A1 | * | 3/2006 | Oshikawa | G06F 1/3221 710/14 |
| 2016/0034340 A1 | * | 2/2016 | Dono | G06F 11/1016 714/758 |

FOREIGN PATENT DOCUMENTS

JP    2009-223380 A    10/2009

* cited by examiner

*Primary Examiner* — Idriss N Alrobaye
*Assistant Examiner* — Henry W Yu
(74) *Attorney, Agent, or Firm* — Oliff PLC

(57) ABSTRACT

A primary check system includes: a control unit configured to output data for primary check to a plurality of primary check circuits as a serial signal via a serial communication line; and a serial and parallel conversion circuit configured to convert the data for primary check, that is received as the serial signal, into a parallel signal and transmit the parallel signal to the plurality of primary check circuits, and the control unit is configured to set the serial and parallel conversion circuit into an active state before a primary check is started, and set the serial and parallel conversion circuit into an inactive state when the primary check is completed.

20 Claims, 2 Drawing Sheets

PRIMARY CHECK SYSTEM

CROSS-REFERENCE TO RELATED APPLICATION

This application is based on and claims priority under 35 USC 119 from Japanese Patent Application No. 2021-136355 filed on Aug. 24, 2021.

TECHNICAL FIELD

The present invention relates to a primary check system.

BACKGROUND ART

There is a system in which a plurality of primary check circuits are connected to a microcomputer, a signal including data for primary check is transmitted to each primary check circuit, and a primary check of a safety circuit is performed. In this case, as the number of primary check circuits increases, the number of ports (terminals) of the microcomputer increases.

One of background art is JP-A-2009-223380.

SUMMARY OF INVENTION

For example, in a microcomputer used in an in-vehicle device, the number of signals to be output tends to increase as the device becomes multifunctional. However, the number of output ports of the microcomputer is limited, and there is a problem that not all required signals can be output.

An object of the present invention is to provide a technique capable of reducing the number of output ports occupied for output when a plurality of output signals are output from a microcomputer.

An aspect of the invention is a primary check system including: a control unit configured to output data for primary check to a plurality of primary check circuits as a serial signal via a serial communication line; and a serial and parallel conversion circuit configured to convert the data for primary check, that is received as the serial signal, into a parallel signal and transmit the parallel signal to the plurality of primary check circuits, wherein the control unit is configured to set the serial and parallel conversion circuit into an active state before a primary check is started, and set the serial and parallel conversion circuit into an inactive state when the primary check is completed.

According to the present invention, it is possible to provide a technique capable of reducing the number of output ports occupied for output when a plurality of output signals are output from a microcomputer.

DESCRIPTION OF EMBODIMENTS

Hereinafter, an embodiment of the present invention will be described with reference to the drawings. A configuration of the following embodiment is an example, and the present invention is not limited to the configuration of the embodiment.

Configuration Example

Figure 1:
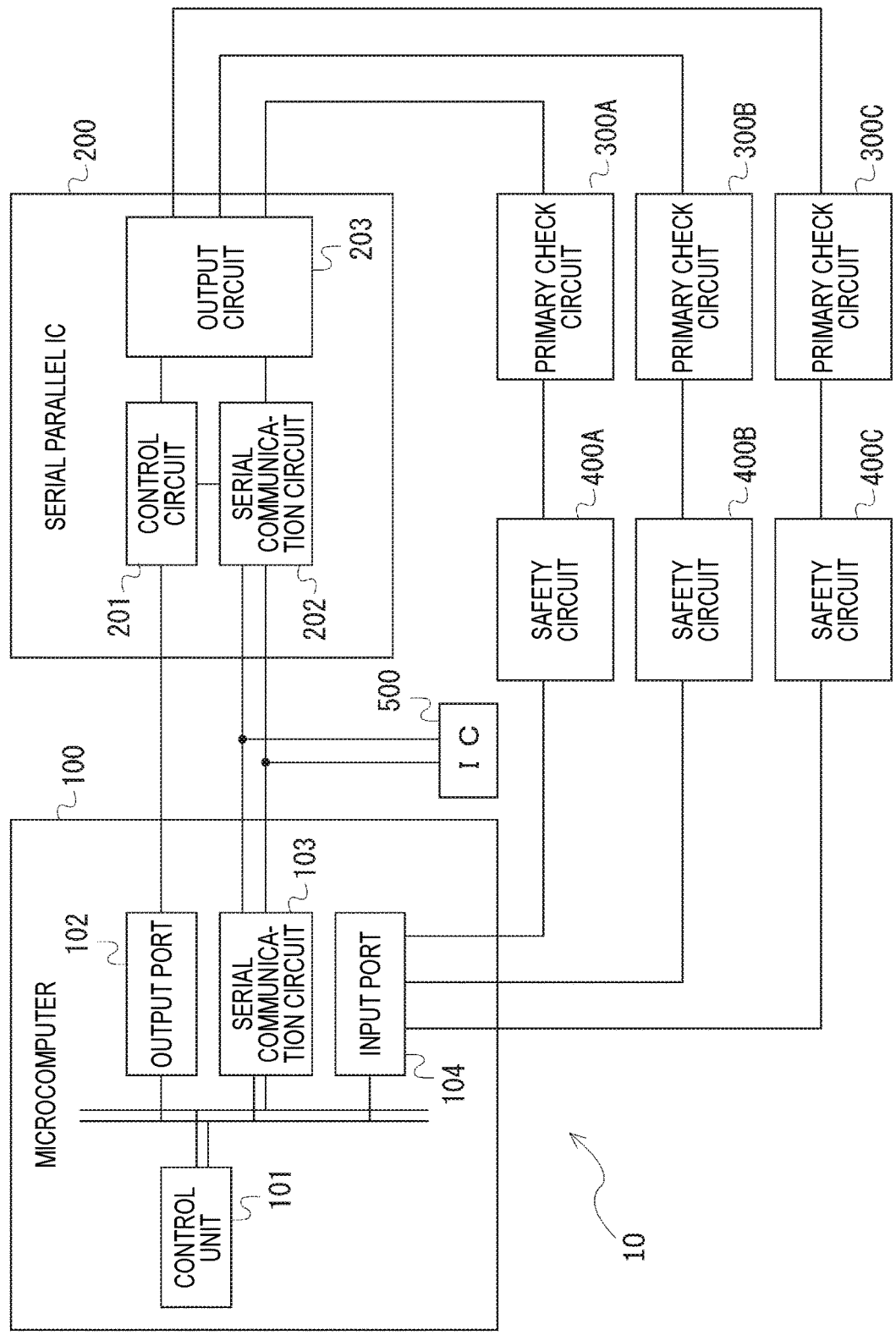
FIG. 1 is a diagram showing an example of a configuration of a primary check system 10.

FIG. 1 is a diagram showing an example of a configuration of a primary check system 10. The primary check system 10 of the present embodiment includes a microcomputer 100 and a serial parallel IC 200 connected to the microcomputer 100. A plurality of primary check circuits 300A, 300B, and 300C are connected to the serial parallel IC 200. The primary check circuits 300A, 300B, and 300C are collectively and simply referred to as a primary check circuit 300. Safety circuits 400A, 400B, and 400C are connected to the primary check circuits 300, respectively. The safety circuits 400A, 400B, and 400C are collectively and simply referred to as a safety circuit 400. The primary check system 10 may include the primary check circuit 300 and the safety circuit 400. Here, the number of the primary check circuits 300 is three and the number of the safety circuits 400 is three, but the number is not limited to three. The primary check system 10 may include a power source or may be configured to receive power supply from an external power source. The primary check system 10 of the present embodiment is used in, for example, an in-vehicle device mounted in a vehicle, is connected to an electronic control unit (ECU), and receives supply of electric power from a battery of the vehicle. The primary check system 10 is not limited to a system used in an in-vehicle device. The primary check system 10 is a system that performs a primary check that is an operation of checking the safety circuit 400 before the safety circuit 400 performs a normal operation.

(Microcomputer)

The microcomputer 100 includes a control unit 101, an output port 102, a serial communication circuit 103, and an input port 104. The microcomputer 100 is, for example, a so-called one-chip microcomputer in which these components are provided in one IC.

The control unit 101 includes a processor and a memory, and integrally executes various types of arithmetic processing in the microcomputer 100. The processor is an arithmetic processing unit such as a central processing unit (CPU), a digital signal processor (DSP), or a field-programmable gate array (FPGA). The memory is a storage unit such as a random access memory (RAM) or a read only memory (ROM), and is used as a main storage unit or an auxiliary storage unit.

The output port 102 is a port that is connected to the serial parallel IC 200 and a signal is output to the serial parallel IC 200 via the output port 102. An enable signal for setting the serial parallel IC 200 to an active state is transmitted to the serial parallel IC 200 via the output port 102.

The serial communication circuit 103 performs serial communication with a serial communication circuit 202 of the serial parallel IC 200. The serial communication circuit 103 is connected with the serial communication circuit 202 of the serial parallel IC 200. The serial communication circuit 103 includes a reception circuit that receives an input signal from the serial parallel IC 200 and a transmission circuit that transmits a signal to the serial parallel IC 200.

The input port 104 is a port that is connected to each safety circuit 400 and a signal from each safety circuit 400 is received via the input port 104.

(Serial Parallel IC)

The serial parallel IC 200 includes a control circuit 201, the serial communication circuit 202, and an output circuit 203. The serial parallel IC 200 is an example of a serial and parallel conversion circuit.

The control circuit 201 integrally executes various types of arithmetic processing in the serial parallel IC 200. The control circuit 201 receives, from the microcomputer 100, the enable signal for setting the serial parallel IC 200 to an active state. The control circuit 201 sets the serial parallel IC into an active state while receiving the enable signal.

The control circuit 201 converts a serial signal received by the serial communication circuit 202 into a parallel signal. The control circuit 201 converts the serial signal into a signal (parallel signal) for each primary check circuit 300 based on a predetermined setting, and outputs the signal via the output circuit 203 to each primary check circuit 300.

The serial communication circuit 202 performs serial communication with the serial communication circuit 103 of the microcomputer 100.

The output circuit 203 is connected to each primary check circuit 300. The output circuit 203 outputs the signal, that is converted from the serial signal, to each primary check circuit 300. A plurality of signal wires may be provided between the output circuit 203 and one primary check circuit 300.

In the example of FIG. 1, two communication wires are used for serial communication between the microcomputer 100 and the serial parallel IC 200, but the present invention is not limited to this configuration. Each communication wire may be connected to another IC chip 500 or the like. Each communication wire includes a branch wire branched from an intermediate part of the communication wire to the IC chip 500 or the like. Each communication wire and each branch wire may be used as a communication wire between the microcomputer 100 and the IC chip 500 or the like when the serial parallel IC 200 is in an inactive state. That is, each communication wire and each branch wire can be used as a communication wire between the microcomputer 100 and the IC chip 500 or the like after the primary check is completed. Each communication wire is an example of a serial communication line. Each branch wire is an example of a branch line. The IC chip 500 is an example of another circuit.

(Primary Check Circuit)

The primary check circuit 300 transmits an inspection signal for primary check at the time of activation of the safety circuit 400. The primary check circuit 300 receives an activation signal from the microcomputer 100 via the serial parallel IC 200, starts to operate when receiving the activation signal, and transmits the inspection signal to the safety circuit 400. The activation signal is, for example, data of a predetermined format such as "1" in a case of a 1-bit signal and "101" in a case of a 3-bit signal. A plurality of signal wires may be provided between the serial parallel IC 200 and one primary check circuit 300, and the primary check circuit 300 may receive a plurality of activation signals. The primary check circuit 300 transmits the inspection signal to the safety circuit 400 based on the received activation signal. A signal wire can be provided between the primary check circuit 300 and the safety circuit 400 for each check item that is determined by the primary check circuit 300. One inspection signal corresponds to, for example, one check item.

(Safety Circuit)

The safety circuit 400 is a circuit that detects such as an abnormality of components or the like in the vehicle. The safety circuit 400 is, for example, a circuit that is connected to a battery of a vehicle and detects an abnormality (for example, a temperature rise, a voltage drop, or the like) of the battery of the vehicle. Further, it is checked whether the safety circuit 400 operates normally at the time of startup of the vehicle or the like based on the inspection signal from the primary check circuit 300. The inspection signal from the primary check circuit 300 is, for example, a signal indicating an abnormality (a signal simulating an abnormality). In the inspection, when the safety circuit 400 receives an inspection signal indicating an abnormality, it is inspected whether the safety circuit 400 operates normally. The safety circuit 400 outputs an inspection result (operation result) of the inspection to the microcomputer 100. The inspection result includes an analog signal and a digital signal. The microcomputer 100 can determine, based on the inspection result, whether the safety circuit 400 is operating normally.

Operation Example

Figure 2:
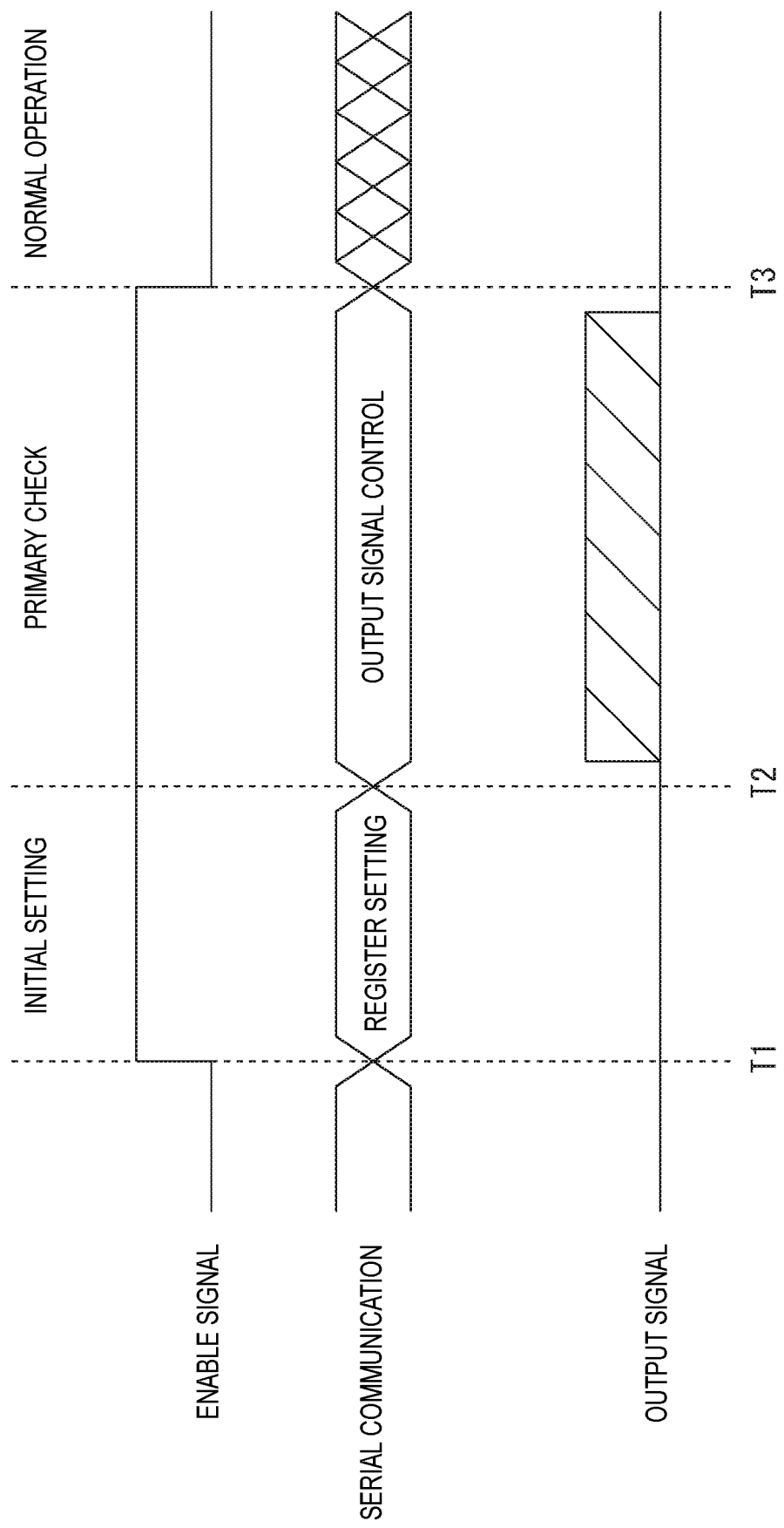
FIG. 2 is a time chart showing timings of an enable signal, serial communication, and an output signal in the primary check system 10.

FIG. 2 is a time chart showing timings of the enable signal, the serial communication, and the output signal in the primary check system 10. In FIG. 2, a horizontal axis represents passage of time. In FIG. 2, a time point T1 is a time point when the primary check system 10 is powered on. The time point T1 is earlier than when the primary check is started. For example, a timing at which an in-vehicle device including the primary check system 10 is mounted in the vehicle, the vehicle is started by turning on an ignition switch (not shown), and the in-vehicle device is powered on is the time point T1. When the power is turned on, the control unit 101 of the microcomputer 100 transmits the enable signal to the serial parallel IC 200 via the output port 102. The enable signal is, for example, a Hi-signal in a Hi-signal and a Lo-signal. The control circuit 201 of the serial parallel IC 200 sets the serial parallel IC 200 into an active state while receiving the enable signal (Hi signal). The control unit 101 of the microcomputer 100 continuously transmits the Hi-signal from when the power is turned on to when the primary check is completed (from T1 to T3). The control circuit 201 of the serial parallel IC 200 sets the serial parallel IC 200 into an inactive state while receiving a Lo-signal (not receiving the Hi-signal). When the serial parallel IC 200 is in the active state, the serial parallel IC 200 can operate. After the serial parallel IC 200 is set to the active state, the microcomputer 100 and the serial parallel IC 200 perform initial setting (register setting). For example, as the initial setting, the control unit 101 of the microcomputer 100 sets setting information for the serial parallel IC 200, and the setting information is such as the signal is to be transmitted to which primary check circuit 300 among the plurality of primary check circuits 300 (the plurality of safety circuits 400) (which safety circuit 400 is to be inspected) in a case of what kind of serial signal. A signal for initial setting (register setting) is transmitted from the serial communication circuit 103 of the microcomputer 100 to the serial communication circuit 202 of the serial parallel IC 200 by the control unit 101 of the microcomputer 100. The control circuit 201 of the serial parallel IC 200 performs initial setting (register setting) based on a signal received by the serial communication circuit 202.

After a time point T2 when the initial setting is completed, the control unit 101 of the microcomputer 100 generates a serial signal including data for operating a specific primary check circuit 300, and transmits the serial signal to the serial parallel IC 200 via the serial communication circuit 103. The data for operating the specific primary check circuit 300 is data corresponding to the activation signal for primary check. The specific primary check circuit 300 may include a plurality of primary check circuits 300. The control unit 101 of the microcomputer 100 generates a serial signal for operating a primary check circuit 300 corresponding to a safety circuit 400 to be inspected (primary-checked). The control unit 101 of the microcomputer 100 may sequentially transmit a plurality of serial signals to the serial parallel IC

200. The control circuit 201 of the serial parallel IC 200 converts, based on the register setting, the serial signal received by the serial communication circuit 202 into a signal (parallel signal) for each primary check circuit 300, and transmits the signal to each primary check circuit 300 via the output circuit 203. The signal is an output signal, and is the activation signal for activating the primary check circuit 300.

For example, when the activation signal is set to "1" and the primary check circuits 300A to 300C are activated, the microcomputer 100 transmits "111" as data corresponding to the activation signal from the serial communication circuit 103 to the serial communication circuit 202 as serial data. The serial parallel IC 200 converts the received serial data into a parallel signal, and outputs the activation signal "1" from the output circuit 203 to each primary check circuit 300.

When receiving the activation signal from the serial parallel IC 200, the primary check circuit 300 starts to operate and transmits the inspection signal for primary check to the safety circuit 400. The inspection signal is, for example, an abnormality indicating signal for inspecting the safety circuit 400. Based on the inspection signal, it is inspected whether the safety circuit 400 operates normally (detects an abnormality) (primary check). When detecting an abnormality based on the inspection signal, the safety circuit 400 outputs a signal including a predetermined result (inspection result) to the microcomputer 100. The microcomputer 100 receives the signal indicating the inspection result from the safety circuit 400 via the input port 104. The control unit 101 of the microcomputer 100 can determine, based on the signal indicating the inspection result from the safety circuit 400, whether the safety circuit 400 is operating normally (perform a primary check) before the normal operation.

When the primary check of the safety circuit 400 is completed (a time point T3), the control unit 101 of the microcomputer 100 transmits a Lo-signal to the serial parallel IC 200 via the output port 102. The control circuit 201 of the serial parallel IC 200 sets the serial parallel IC 200 into an inactive state while receiving the Lo-signal. When the serial parallel IC 200 is in the inactive state, the serial parallel IC 200 does not operate. Since the serial parallel IC 200 does not operate, the primary check circuit 300 does not transmit a signal to the safety circuit 400. After the time point T3, the microcomputer 100, the safety circuit 400, and the like perform the normal operation. That is, for example, the safety circuit 400 is in a state in which an abnormality or the like of a component or the like in the vehicle can be detected.

Operation and Effects of Embodiment

At the time of activation, the primary check system 10 of the present embodiment transmits an enable signal from the microcomputer 100 to the serial parallel IC 200 to set the serial parallel IC 200 into an active state. The microcomputer 100 generates a serial signal for operating a specific primary check circuit 300, and transmits the serial signal to the serial parallel IC 200. The serial parallel IC 200 converts the serial signal into a parallel signal, and transmits an activation signal to each of the plurality of primary check circuits 300 including the specific primary check circuit 300. The specific primary check circuit 300 transmits an inspection signal to the safety circuit 400 based on the activation signal received from the serial parallel IC 200. The safety circuit 400 transmits, to microcomputer 100, a signal including a response (operation result) to the inspection signal. Thus, by using the serial signal, it is not necessary to increase the number of ports (terminals) of the microcomputer 100 even if the number of primary check circuits 300 and safety circuits 400 is increased. Further, by using the serial signal, it is not necessary to increase the number of ports (terminals) of the microcomputer 100 even if the number of outputs to the primary check circuit 300 (the number of check items of the primary check circuit 300) is increased. In a case where the number of the primary check circuits 300, the number of the safety circuits 400 and the number of outputs to the primary check circuit 300 are increased, for example, the number of signal wires between the serial parallel IC 200 and the primary check circuit 300 can be increased. Further, by setting the serial parallel IC 200 into an inactive state during a time other than the primary check time, the signal wire for transmitting and receiving the serial signal can branch and can be connected to another IC chip 500. Accordingly, there is no need to provide a dedicated port for primary check in the microcomputer 100. As a result, the number of terminals (ports) provided in the microcomputer 100 is reduced.

Although the embodiments of the present invention have been described above, these embodiments are merely examples, the present invention is not limited thereto, and various modifications based on the knowledge of those skilled in the art can be made without departing from the gist of the claims.

REFERENCE SIGNS LIST

10: primary checking system
100: microcomputer
101: control unit
102: output port
103: serial communication circuit
104: input port
200: serial parallel IC
201: control circuit
202: serial communication circuit
203: output circuit
300: primary check circuit
400: safety circuit
500: IC chip

What is claimed is:

1. A primary check system comprising:
   a control unit configured to output data for primary check to a plurality of primary check circuits as a serial signal via a serial communication line; and
   a serial and parallel conversion circuit configured to convert the data for primary check, that is received as the serial signal, into a parallel signal and transmit the parallel signal to the plurality of primary check circuits, wherein
   the control unit is configured to set the serial and parallel conversion circuit into an active state before a primary check is started, and set the serial and parallel conversion circuit into an inactive state when the primary check is completed.

2. The primary check system according to claim 1, wherein
   the serial communication line includes a branch line branched from an intermediate part of the serial communication line, the branch line is connected to another circuit different from the serial and parallel conversion circuit, and when the primary check is completed and the serial and parallel conversion circuit is in the inactive state, a serial signal is output to the another circuit via the branch line.

3. The primary check system according to claim 1, wherein
the control unit is configured to set the serial and parallel conversion circuit into the active state when the primary check system is powered on.

4. The primary check system according to claim 1, wherein
the data for primary check is an activation signal to activate the plurality of primary check circuits.

5. The primary check system according to claim 4, wherein
the activation signal is configured by 1-bit.

6. The primary check system according to claim 1, further comprising:
a plurality of safety circuits configured to perform the primary check based on an inspection signal output from the plurality of primary check circuits, wherein
the plurality of safety circuits is configured to output a signal including a result of the primary check in a case where an abnormality is detected by the primary check.

7. The primary check system according to claim 6, wherein the control unit is configured to:
receive the signal including the result of the primary check output from the plurality of safety circuits; and
determine, based on the signal including the result of the primary check, whether the plurality of safety circuits is operating normally.

8. The primary check system according to claim 6, wherein
the inspection signal output from the plurality of primary check circuits simulates an abnormality that is to be detected by the plurality of safety circuits.

9. The primary check system according to claim 7, wherein
the inspection signal output from the plurality of primary check circuits simulates an abnormality that is to be detected by the plurality of safety circuits.

10. The primary check system according to claim 1, wherein
the control unit outputs an enable signal to the serial and parallel conversion circuit to set the serial and parallel conversion circuit to the active state, and the control unit stops outputting the enable signal to the serial and parallel conversion circuit to set the serial and parallel conversion circuit to the inactive state.

11. A primary check method performed by a primary check system including a serial and parallel conversion circuit configured to convert data for primary check, that is received as a serial signal, into a parallel signal and transmit the parallel signal to a plurality of primary check circuits, the method comprising:
outputting the data for primary check to the serial and parallel conversion circuit as the serial signal via a serial communication line; and
controlling the serial and parallel conversion circuit by:
setting the serial and parallel conversion circuit into an active state before a primary check is started, and setting the serial and parallel conversion circuit into an inactive state when the primary check is completed.

12. The primary check method according to claim 11, wherein
the serial communication line includes a branch line branched from an intermediate part of the serial communication line, the branch line is connected to another circuit different from the serial and parallel conversion circuit, and when the primary check is completed and the serial and parallel conversion circuit is in the inactive state, outputting a serial signal to the another circuit via the branch line.

13. The primary check method according to claim 11, wherein
the controlling comprises: setting the serial and parallel conversion circuit into the active state when the primary check system is powered on.

14. The primary check method according to claim 11, wherein
the data for primary check is an activation signal to activate the plurality of primary check circuits.

15. The primary check method according to claim 14, wherein
the activation signal is configured by 1-bit.

16. The primary check method according to claim 11, further comprising:
performing the primary check by a plurality of safety circuits based on an inspection signal output from the plurality of primary check circuits, wherein
the plurality of safety circuits output a signal including a result of the primary check in a case where an abnormality is detected by the primary check.

17. The primary check method according to claim 16, wherein the controlling comprises:
receiving the signal including the result of the primary check output from the plurality of safety circuits; and
determining, based on the signal including the result of the primary check, whether the plurality of safety circuits is operating normally.

18. The primary check method according to claim 16, wherein
the inspection signal output from the plurality of primary check circuits simulates an abnormality that is to be detected by the plurality of safety circuits.

19. The primary check method according to claim 17, wherein
the inspection signal output from the plurality of primary check circuits simulates an abnormality that is to be detected by the plurality of safety circuits.

20. The primary check method according to claim 11, wherein
the controlling includes outputting an enable signal to the serial and parallel conversion circuit to set the serial and parallel conversion circuit to the active state, and stopping the outputting of the enable signal to the serial and parallel conversion circuit to set the serial and parallel conversion circuit to the inactive state.

* * * * *